United States Patent [19]

McCall

[11] Patent Number: 5,755,911
[45] Date of Patent: May 26, 1998

US005755911A

[54] METHOD FOR MAKING A CUSTOM SHIM FOR A DIE COMPONENT HAVING BLIND HOLES

[76] Inventor: Terry R. McCall, 112 Disosway St., Black Mountain, N.C. 28711

[21] Appl. No.: 720,185

[22] Filed: Sep. 25, 1996

[51] Int. Cl.[6] ........................................... B32B 31/18
[52] U.S. Cl. ........................ 156/247; 156/249; 156/250; 156/267; 83/14; 29/17.2; 29/DIG. 1; 264/138
[58] Field of Search .................................. 156/247, 248, 156/249, 250, 267, 268, 277; 83/14, 31; 29/DIG. 1, 17.2; 264/138, 153

[56] References Cited

U.S. PATENT DOCUMENTS

| | | |
|---|---|---|
| 4,526,641 | 7/1985 | Schriever et al. ............... 156/247 |
| 4,809,421 | 3/1989 | Justice . |
| 4,848,137 | 7/1989 | Turner et al. . |

*Primary Examiner*—Curtis Mayes
*Attorney, Agent, or Firm*—Lloyd L. Zickert

[57] ABSTRACT

An apparatus and method for making a custom shim for a die component having one or more blind holes, where the apparatus includes a preformed laminate having an adhesive layer, a protective layer removably attached to one side of the adhesive layer, and a paper impression layer attached to the opposite side of the adhesive layer. The method includes the steps of removing the protective layer from the adhesive layer, attaching the exposed adhesive layer to a piece of shim stock, applying ink to the surface of the die component having the blind hole(s), placing that surface of the die component on the paper layer to form thereon an ink impression of the die component, removing the die component from the paper layer, cutting the piece of shim stock in accordance with the ink impression, and removing the laminate from the cut shim stock to uncover the custom shim which accurately maintains the relationship between the blind hole and the outer contour of the die component.

20 Claims, 2 Drawing Sheets

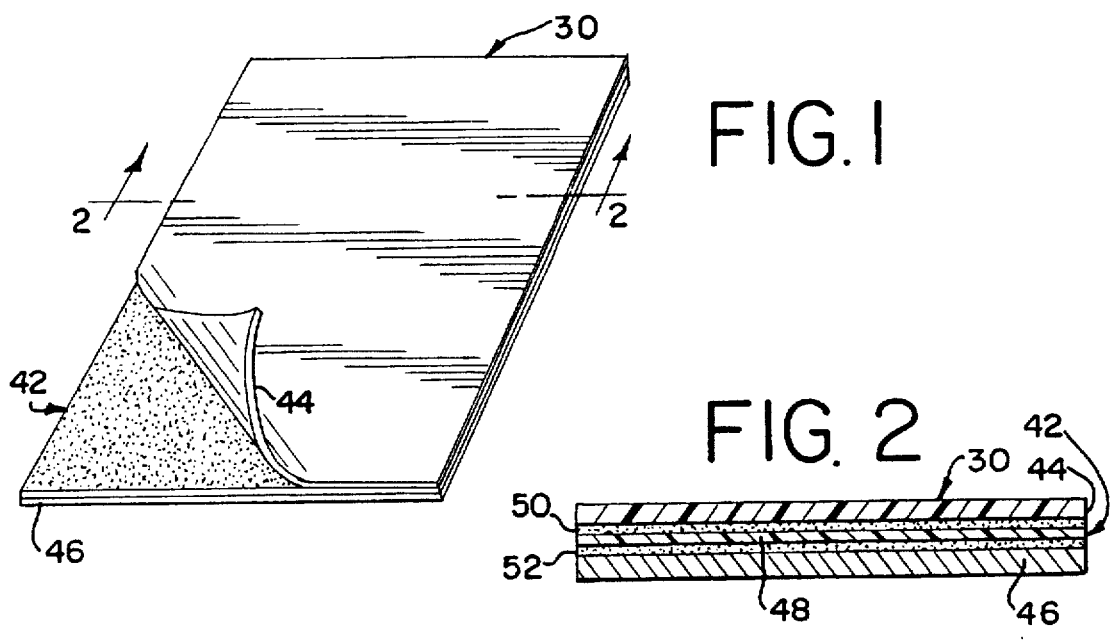
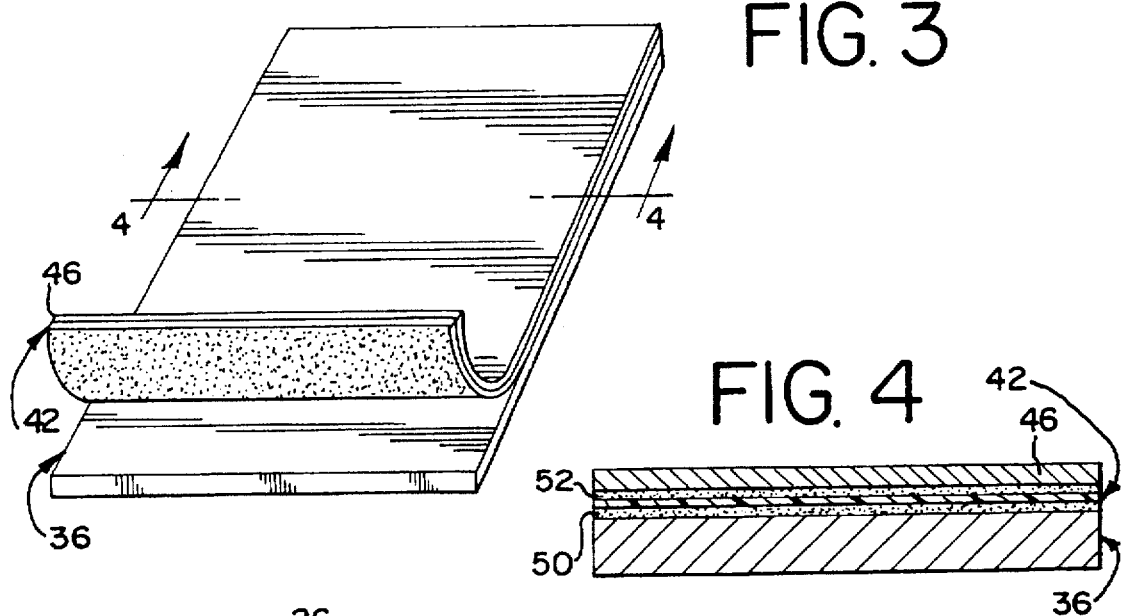
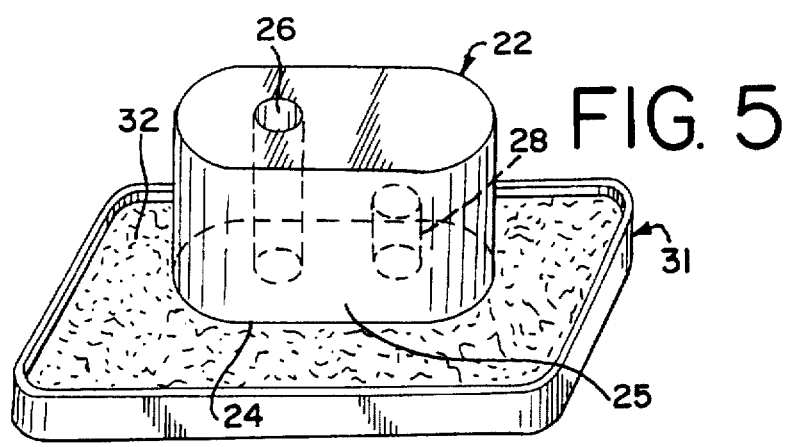

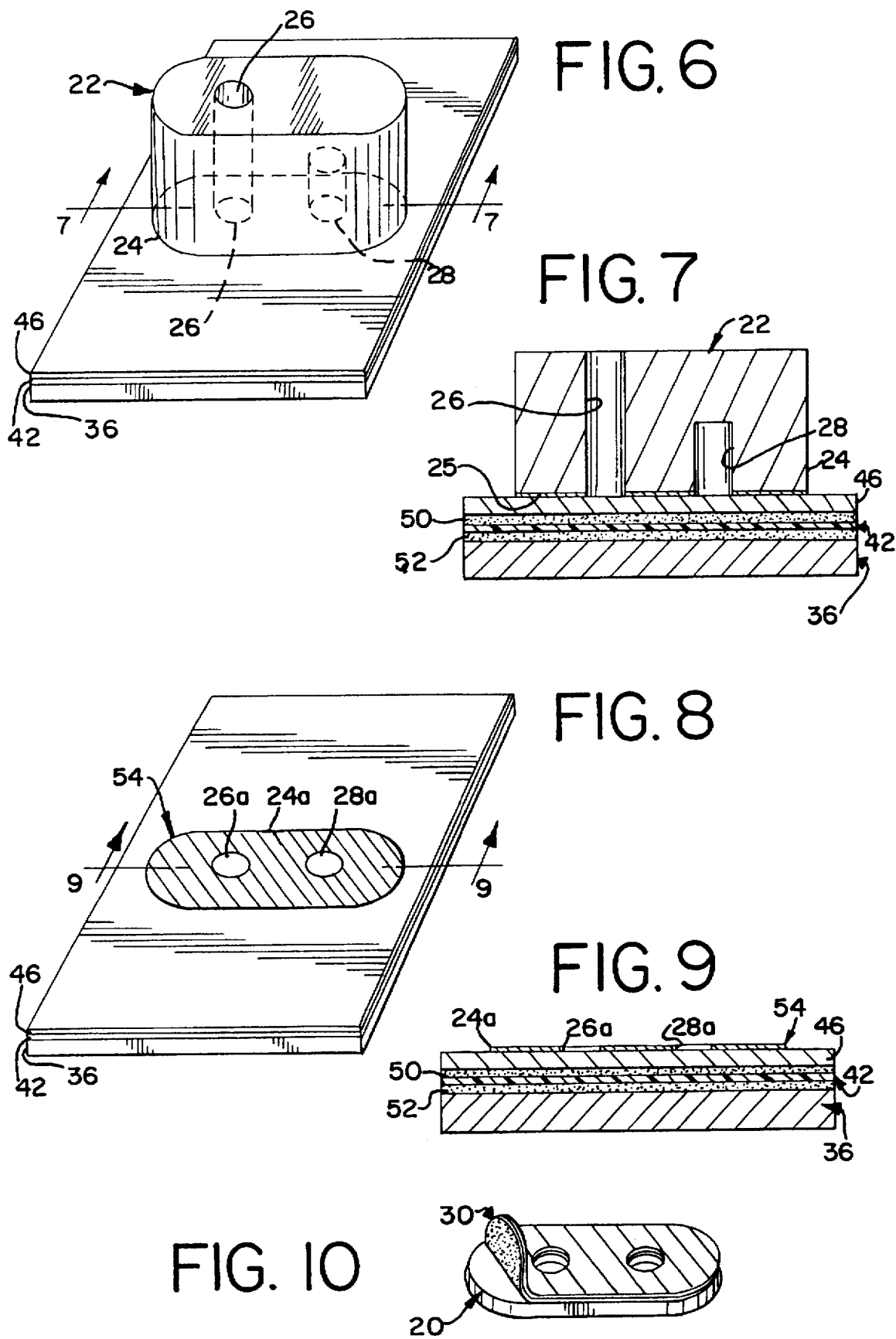

METHOD FOR MAKING A CUSTOM SHIM FOR A DIE COMPONENT HAVING BLIND HOLES

DESCRIPTION

This invention relates in general to an apparatus and method for making custom shims, and more particularly to an apparatus and method for making custom shims for die components having one or more blind holes which accurately replicates the relationship between the blind holes and outer contour of the die component on the custom shim.

BACKGROUND OF THE INVENTION

In tool and die work, die components or blanking dies often need sharpening to maintain their precision and accuracy in accordance with manufacturing tolerances. A die component is sharpened by grinding off or cutting the appropriate face or surface of the die component in a conventional manner. To replace or compensate for the material ground or cut off of the face of the die component, it is common to place a shim under the die component to level out the die component and keep all components in the tool at the same relationship. The shim consists of a relatively thin piece of material usually having a .001 to .032 inch thickness. The shim must be formed with substantially the same outer contour or configuration as the die component and must maintain the location of the holes in relation to the outer contour as that of the die component.

These shims have heretofore been made by painting a dye on a piece of metal shim stock and placing the die component on the dye-covered shim stock. The outer contour and the through holes of the die component are then etched into the dye-covered shim stock in a conventional manner. After etching, the die component is removed from the shim stock and any blind holes in the die component are approximately etched in the dye-covered shim stock by hand. Shears, scissors, and hole punches are then used to form the shim according to the etching. This method often results in the loss of the exact relationship between the blind hole locations and the outer contour of the die component which affects the ability of the shims to line up with the die components. If the shims do not exactly line up with the die components, the shims need to be trimmed, reworked, or totally scraped. These deficiencies in the shim producing methods heretofore known substantially increases the time and expense in the shim producing process as well as in the overall die component sharpening process. Accordingly, there is a need for an apparatus and method for making custom shims for die components having blind holes which accurately transfers the relationship between the blind holes and outer contour of the die component to the custom shim.

SUMMARY OF THE INVENTION

The present invention overcomes the above problems in providing an apparatus and method for making a custom shim from shim stock for a die component having one or more blind holes which accurately transfers the relationship between the blind holes and the outer contour of the die component to the shim, thereby resulting in a precise shim which properly lines up with the die component. The shim stock may be metal, plastic, natural or synthetic rubber, or any desired sheet material for making a shim or gasket. The apparatus of the present invention which may come in kit form including a preformed laminate, ink, an ink applying device such as an ink pad, and possibly one or more sheets of metal shim stock. The laminate which may be formed in various shapes and sizes includes an adhesive layer, a removable or peelable protective layer attached to one side of the adhesive layer, and an impression or paper layer attached to the opposite side of the adhesive layer.

To make the custom shim according to the method of the present invention, the protective layer is removed from the adhesive layer of the preformed laminate and the exposed adhesive layer is attached to a piece or section of shim stock. Ink is then applied to the appropriate surface of the die component and the inked surface of the die component is placed on the impression or paper layer of the laminate. This forms an ink impression of the die component including an impression of the blind holes in the die component on the paper layer of the laminate. The die component is then removed from the paper layer, the ink is allowed to dry, and the piece of shim stock and the laminate are cut and/or punched in accordance with the lines of the ink impression on the paper layer. The adhesive and paper layers of the laminate are then removed from the shim stock and the shim stock is in the form of the desired custom shim. This process accurately replicates the relationship between the blind holes and the outer contour of the die component on the shim and thus produces a more precise custom shim. This process can also be used to make other custom parts such as gaskets or spacers.

An alternative method would include forming the impression on the preformed laminate prior to peeling the protective layer and attaching the adhesive layer and impression layer to the shim stock, and thereafter removing the protective layer and attaching the laminate to shim stock.

It is therefore an object of the present invention to provide a method of making a custom shim for a die component.

Another object of the present invention is to provide a method of making a custom shim for a die component having one or more blind holes.

A further object of the present invention is to provide a method of making a custom shim for a die component having one or more blind holes which accurately transfers the relationship between the blind holes and the outer contour of the die component to the custom shim.

A further object of the present invention is to provide an apparatus or kit for making a custom shim for die components.

A still further object of the present invention is to provide an apparatus or kit for making a custom spacers, gaskets, and other such custom parts from stock material.

Other objects, features and advantages of the invention will be apparent from the following detailed disclosure, taken in conjunction with the accompanying sheets of figures, wherein like reference numerals refer to like parts.

DESCRIPTION OF THE DRAWINGS

FIG. 1 is a perspective view of the laminate of the present invention and illustrating the partial removal of the protective layer of the laminate from the adhesive layer of the laminate;

FIG. 2 is a detailed cross-sectional view of the laminate taken substantially along line 2—2 of FIG. 1 and illustrating the protective layer, the adhesive layer, and the paper impression layer of the laminate;

FIG. 3 is a perspective view of the laminate less the protective layer on the piece of metal shim stock and illustrating the attachment of the paper impression layer and the adhesive layer to the top surface of the shim stock;

FIG. 4 is a detailed cross-sectional view taken substantially along line 4—4 of FIG. 3 and illustrating the paper impression layer, the adhesive layer, and the shim stock;

FIG. 5 is a perspective view of a die component having a through hole and a blind hole positioned on an ink pad;

FIG. 6 is a perspective view of the die component positioned on the paper impression layer of the laminate which is attached to the piece of shim stock;

FIG. 7 is a detailed cross-sectional view taken substantially along line 7—7 of FIG. 6, and showing the inked die component applied to the impression layer of the laminate on the shim stock;

FIG. 8 is a perspective view of the ink impression left on the paper impression layer of the laminate when the die component is removed;

FIG. 9 is a cross-sectional view taken substantially along line 9—9 of FIG. 8 and illustrating an ink impression on the paper impression layer of the laminate; and FIG. 10 is a perspective view of a completed shim cut from the shim stock and showing the peeling of the impression layer from the shim.

DESCRIPTION OF THE INVENTION

The present invention is directed to an apparatus and method for making a custom shim for a die component having one or more blind holes which accurately transfers the relationship between the blind holes and the outer contour of the die component to the shim. Referring now to the figures, and generally to FIGS. 1 to 10, the apparatus or kit of the present invention for making a custom shim 20 for a die component 22 includes a preformed laminate 30, an ink applicator in the form of an ink pad 31 from which ink 32 can be extracted, and a piece of metal shim stock 36. It will be appreciated the kit may or may not include shim stock, which may be of any suitable material. The specific steps of the method of making a custom shim for a die component according to the present invention are also illustrated in FIGS. 1 through 10.

More particularly, referring now to FIGS. 1 and 2, the preformed laminate 30 includes an adhesive layer 42 sandwiched between a removable or peelable protective layer 44 attached to one side of the adhesive layer 42, and an impression layer 46 attached to the opposite side of the adhesive layer 42. The laminate 30 is rectangular in shape and approximately the same size as the piece of shim stock 36, although it should be appreciated that the shape and size of the laminate, as well as the piece of shim stock, could vary, in part depending on the size and shape of the die component 22. The die component 22 as illustrated in FIGS. 5 to 7 has an outer contour 24, a face or surface 25, a vertically extending through hole 26 having an opening at surface 25, and a vertically extending blind hole 28 having an opening at surface 25. It should be appreciated that the die component could have additional through holes and/or blind holes and could vary in shape and size.

The adhesive layer 42 of the laminate 30 which affixes or laminates the impression layer 46 to the piece of shim stock 36 consists of a suitably sized section of double sided sticky tape. The double sided sticky tape includes a thin foam sheet 48 having coatings of adhesive 50 and 52, respectively, on each side thereof. The preferred double-sided sticky tape is a commercially available 3M series 4000 double-coated foam tape, although double-sided tapes of any suitable type from other manufacturers may be used. 3M is a registered trademark of the Minnesota Mining and Manufacturing Company of Saint Paul, Minnesota. It should further be appreciated that the adhesive layer 42 could be formed in any suitable manner such as a pure layer of adhesive affixed to the impression layer 46.

The peelable protective layer 44 of the laminate 30 which protects the adhesive layer 42 during handling of the laminate 30 consists of suitably sized section of vinyl or polyester sheeting which is removably attached to the adhesive coating 50 on one side of the adhesive layer 42. The preferred vinyl or polyester protective layer is commercially available from 3M or other sources, such as Mylar film, which is commercially available from DuPont. Mylar is a registered trademark of DuPont. It should be appreciated that the protective layer could be formed from other suitable materials. Additionally, the protective layer 44 may have instructions or information about the laminate and the method of the present invention directly imprinted on the side which does not engage the adhesive layer or may have a separate instruction sheet suitably attached to that side.

The impression or imprintable layer 46 is adapted to accept and maintain an impression of the die component 22 and preferably consists of a sheet of suitable grade paper attached to the adhesive coating 52 on the side of the adhesive layer 42 opposite the protective layer 44. The paper is preferably a 20 pound grain long white laser paper adapted to absorb ink. This type of paper is commercially available as "20#" paper from Nationwide Papers. It should be appreciated that other suitable types, grades, and colors of ink-absorbing paper or other ink-receiving materials could be employed in the laminate of the present invention.

The laminate described having the double-stick tape as an adhesive layer has a stiffness that facilitates handling during the shim-making process. However, stiffness could also be added to the laminate by having the impression layer of a material that has a stiffness. It should also be appreciated the laminate may be relatively flexible.

Referring now to FIG. 5, the ink applicator which is used to apply ink to the appropriate surface 25 of the die component 22 consists of a standard office type ink pad 31 and a conventional layout fluid ink 32. The standard ink pad 31 has been found to generate the most even and uniform distribution of ink to the entire face 25 of the die component 22. It should be appreciated that other suitable inks and ink applying apparatus such as a brush, roller, or spray apparatus could be used to apply ink to the appropriate surface of the die component.

The method of making the custom shim pursuant to the present invention is further illustrated in FIGS. 1 to 10. Initially, the die component 22 and the piece of steel shim stock 36 should be thoroughly cleaned in a conventional manner. The protective layer 44 is then removed or peeled from the adhesive layer 42 of the laminate 30, as illustrated in FIG. 1. The adhesive coating 50 on the exposed side of the adhesive layer 42 of the laminate 30 is then attached to the piece of shim stock 36 which is to be cut into the custom shim, as illustrated in FIG. 3. The laminate 30 is placed flush against the piece of shim stock such that no air pockets are formed between the laminate and the piece of shim stock.

Ink 32 is then be applied to the appropriate surface 25 of the die component 22 by pressing that surface on the ink applicator or pad 31, as illustrated in FIG. 5, to uniformly and evenly cover that surface with ink. The surface 25 of the die component 22, which includes the through hole 26 and the blind hole 28, is then placed on the impression or paper layer 46 to form thereon an ink impression 54 of the die component 22, as shown in FIGS. 6 and 7. The die component 22 is then removed from the paper impression layer 46 and the ink 32 is allowed to dry. The ink impression 54 left on the impression layer 46 includes an impression 24a of the outer contour of the die component 22 and an impression of the through and blind holes 26a and 28a in exact relationship to the outer contour 24 of the die component, as illustrated in FIG. 8.

The laminate 30 having the ink impression 54 and the piece of shim stock 36 are then cut using shears, scissors, punches, and/or other standard cutting apparatus to form the custom shim 20 in accordance with the ink impression 54. After the piece of shim stock is cut, the laminate 30 is peeled off or removed from the shim stock which leaves the custom shim 20, as shown in FIG. 10. The custom shim 20 replicates the relationship between the holes and outer contour as found in the die component 22.

It should be appreciated that the order of the steps of the method of the invention could be altered. For instance, the ink impression could be made on the paper impression layer of the laminate and then the laminate could be applied to the piece of shim stock. More specifically, after cleaning the die component, the ink 32 is initially applied to the surface 25 of the die component 22 and that surface is placed on the paper impression layer 46 to form thereon an ink impression 54 of the die component 22. The die component 22 is then removed from the impression layer 46 and the ink is allowed to dry. Thereafter, the protective layer 44 is removed from the adhesive layer of the laminate and the exposed adhesive layer of the laminate is attached to the piece of shim stock 36. The piece of shim stock and the laminate are then cut in accordance with the ink impression 54 and the laminate is thereafter removed from the cut custom shim 20.

The apparatus, kit, and method of the present invention could also be used to form other custom parts from plastic stock material, foam stock material, or any other suitable stock material. Likewise, the present invention could alternatively be use to form any custom part, such as a spacer or a gasket, which mirrors the outer and/or inner contour and holes of a component or which is adapted to fit between two components for the purpose of spacing the components or providing a seal between the components.

It will be understood that modifications and variations may be effected without departing from the scope of the novel concepts of the present invention, but it is understood that this application is to be limited only by the scope of the appended claims.

The invention is hereby claimed as follows:

1. A method of making a part from a substrate which mirrors the contour of a component using a laminate having an adhesive layer and an impression layer attached to one side of said adhesive layer, said method comprising the steps of
   a) forming an impression of said component on said laminate impression layer, and
   b) cutting the substrate and the laminate in accordance with the impression formed on the impression layer of said laminate which is removably attached to said substrate, and
   c) removing the laminate from the cut substrate.

2. The method of claim 1, wherein the part is a a spacer or a gasket or shim.

3. A method of making a custom shim from a piece of shim stock for a die component, said method comprising the steps of
   a) laminating the piece of shim stock with a laminate, said laminate having an impression layer,
   b) forming an impression of said die component including any blind holes in the die component on the impression layer,
   c) cutting the piece of shim stock and the laminate in accordance with the impression formed on the impression layer, and d) removing the laminate from the cut shim stock which comprises the custom shim.

4. The method of making a custom shim according to claim 3 wherein the laminate includes an adhesive layer on one side of the impression layer and a protective layer attached to the adhesive layer, and which further includes the step of removing the protective layer from the adhesive layer before laminating the piece of shim stock.

5. The method of making a custom shim according to claim 3 wherein the impression layer consists of ink absorbing paper and the impression of the die component on said impression layer is formed by the steps of
   applying ink to a surface of the die component,
   placing said surface of the die component on the paper impression layer and forming thereon an ink impression of the die component, and
   removing the die component from the paper impression layer.

6. The method of making a custom shim according to claim 5, wherein the ink is applied to the die component by placing said surface of the die component on an ink pad.

7. A method of making a custom shim from a piece of shim stock for a die component, said method comprising the steps of
   a) forming an impression of said die component including any blind holes in the die component on a laminate, said laminate having an impression layer,
   b) laminating said piece of shim stock with said laminate,
   c) cutting the piece of shim stock and the laminate in accordance with the impression formed on the impression layer, and
   d) removing the laminate from the cut piece of shim stock.

8. The method of making a custom shim according to claim 7, wherein the laminate includes an adhesive layer attached to one side of the impression layer and a protective layer attached to the adhesive layer, and which further includes the step of removing the protective layer from the adhesive layer before laminating the piece of shim stock with the laminate.

9. The method of making a custom shim according to claim 7, wherein the impression layer consists of ink absorbing paper and the impression of the die component on said impression layer is formed by the steps of
   applying ink to a surface of the die component,
   placing said surface of the die component on the paper impression layer and forming thereon an ink impression of the die component, and
   removing the die component from the paper impression layer.

10. The method of making a custom shim according to claim 9, wherein the ink is applied to the die component by placing said surface of the die component on an ink pad to generate an even and uniform distribution of ink on the surface of the die component.

11. A method of making a custom shim from a piece of shim stock for a die component using a laminate having an adhesive layer, a protective layer attached to one side of the adhesive layer, and an impression layer attached to the opposite side of the adhesive layer, said method comprising the steps of
   a) removing the protective layer from the adhesive layer,
   b) attaching the exposed adhesive layer to said piece of shim stock,
   c) applying ink to a surface of said die component,
   d) placing said surface of the die component on the impression layer and forming thereon an ink impression of the die component including any blind holes in the die component, e) removing the die component from the impression layer, f) cutting the piece of shim stock and the laminate in accordance with the ink impression on the impression layer, and g) removing the laminate from the cut shim stock which comprises the custom shim.

12. The method of claim 11, wherein the adhesive layer of the laminate consists of double sided sticky tape having a central section and a coating of adhesive on each side of said central section.

13. The method of claim 12, wherein the impression layer of the laminate consists of ink-absorbing paper attached to said adhesive coating on one side of the central section of the double sided sticky tape.

14. The method of claim 13, wherein the protective layer of the laminate consists of a sheet of vinyl removably attached to said adhesive coating on the opposite side of the central section of the double sided sticky tape.

15. The method of claim 14, wherein the ink is applied to the surface of said die component by placing said surface on an ink pad to generate an even and uniform distribution of ink on the surface of the die component.

16. A method of making a custom shim from a piece of shim stock for a die component using a laminate having an adhesive layer, a protective layer attached to one side of the adhesive layer, and an impression layer attached to the opposite side of the adhesive layer, said method comprising the steps of a) applying ink to a surface of said die component, b) placing said surface of the die component on the impression layer and forming thereon an ink impression of the die component including any blind holes in the die component, c) removing the die component from the impression layer, d) removing the protective layer from the adhesive layer, e) attaching the exposed adhesive layer to said piece of shim stock, f) cutting the piece of shim stock and the laminate in accordance with the ink impression on the impression layer, and g) removing the laminate from the cut shim stock which comprises the custom shim.

17. The method of claim 16, wherein the adhesive layer of the laminate consists of double sided sticky tape having a central section and a coating of adhesive on each side of said central section.

18. The method of claim 17, wherein the impression layer of the laminate consists of ink-absorbing paper attached to said adhesive coating on one side of the central section of the double sided sticky tape.

19. The method of claim 18, wherein the protective layer of the laminate consists of a sheet of vinyl removably attached to said adhesive coating on the opposite side of the central section of the double sided sticky tape.

20. The method of claim 19, wherein the ink is applied to the surface of said die component by placing said surface on an ink pad.

* * * * *